(12) United States Patent
Koopferstock

(10) Patent No.: US 11,038,614 B2
(45) Date of Patent: Jun. 15, 2021

(54) OPTICAL SYSTEM INCLUDING A RECONFIGURABLE OPTICAL ADD/DROP MULTIPLEXER AND FILTERS

(71) Applicant: Fujitsu Limited, Kanagawa (JP)

(72) Inventor: Eric Koopferstock, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/379,280

(22) Filed: Apr. 9, 2019

(65) Prior Publication Data
US 2020/0328836 A1 Oct. 15, 2020

(51) Int. Cl.
*H04J 14/02* (2006.01)

(52) U.S. Cl.
CPC ...... *H04J 14/0212* (2013.01); *H04J 14/0204* (2013.01); *H04J 14/0205* (2013.01); *H04J 14/0216* (2013.01)

(58) Field of Classification Search
CPC ... H04J 14/0212; H04J 14/021; H04J 14/0217
See application file for complete search history.

(56) References Cited

U.S. PATENT DOCUMENTS

| | | | | |
|---|---|---|---|---|
| 5,953,141 A * | 9/1999 | Liu | ................. | H04J 14/0206 385/24 |
| 9,432,113 B2 * | 8/2016 | Oi | ................. | H04B 10/0797 |
| 9,444,572 B2 * | 9/2016 | Kaneoka | ............ | H04J 14/0208 |
| 9,893,804 B1 | 2/2018 | Koopferstock et al. | | |
| 10,009,671 B2 * | 6/2018 | Younce | ............ | H04B 10/0773 |
| 1,001,497 A1 | 7/2018 | Koopferstock et al. | | |
| 2001/0030797 A1 * | 10/2001 | Kosaka | ............ | H04B 10/294 359/337.5 |
| 2002/0093707 A1 * | 7/2002 | Katagiri | ............ | H04Q 11/0005 398/85 |
| 2005/0129403 A1 | 6/2005 | Koopferstock | | |
| 2006/0013587 A1 * | 1/2006 | Scott | ................. | H04J 14/0205 398/83 |
| 2008/0013950 A1 * | 1/2008 | Boudreault | ......... | H04J 14/0286 398/59 |
| 2008/0232800 A1 * | 9/2008 | Jensen | ............ | H04J 14/0217 398/48 |
| 2011/0076016 A1 * | 3/2011 | Wisseman | ......... | H04J 14/0204 398/48 |
| 2011/0085803 A1 * | 4/2011 | Ji | ................. | H04J 14/0212 398/79 |
| 2011/0188853 A1 * | 8/2011 | Schimpe | ............ | H04J 14/0209 398/38 |

(Continued)

*Primary Examiner* — Jai M Lee
(74) *Attorney, Agent, or Firm* — Baker Botts L.L.P.

(57) ABSTRACT

An optical system including a first filter including i) a first port mapped to a first wavelength band and ii) a second port mapped to a second wavelength band, the first filter configured to receive a first transmission signal at the first port and a second transmission signal at the second port, the first transmission signal within the first wavelength band, the second transmission signal within the second wavelength bands; a second filter including i) a third port mapped to the first wavelength band and ii) a fourth port mapped to the second wavelength band, the second filter configured to receive a third transmission signal at the third port and a fourth transmission signal at the fourth port, the third transmission signal within the first wavelength band, the fourth transmission signal within the second wavelength band and; and a wavelength selector.

12 Claims, 5 Drawing Sheets

(56) References Cited

U.S. PATENT DOCUMENTS

| | | | | |
|---|---|---|---|---|
| 2011/0286746 A1* | 11/2011 | Ji | H04J 14/0204 | 398/83 |
| 2012/0020664 A1* | 1/2012 | Sakurai | H04Q 11/0005 | 398/50 |
| 2012/0087657 A1* | 4/2012 | Jander | H04Q 11/0005 | 398/48 |
| 2012/0087658 A1* | 4/2012 | Jander | H04Q 11/0005 | 398/48 |
| 2012/0155871 A1* | 6/2012 | Fukashiro | H04J 14/0204 | 398/50 |
| 2012/0201541 A1* | 8/2012 | Patel | H04J 14/0212 | 398/58 |
| 2012/0301137 A1* | 11/2012 | Sakamoto | H04B 10/0771 | 398/16 |
| 2012/0308179 A1* | 12/2012 | Jiang | H04J 14/0212 | 385/16 |
| 2014/0140692 A1* | 5/2014 | Oda | H04J 14/0212 | 398/23 |
| 2015/0055952 A1* | 2/2015 | Younce | H04J 14/0217 | 398/48 |
| 2015/0125141 A1* | 5/2015 | Hu | H04B 10/0793 | 398/5 |
| 2015/0208146 A1* | 7/2015 | Younce | H04J 14/0212 | 398/21 |
| 2015/0280854 A1* | 10/2015 | Matsukawa | H04J 14/0273 | 398/3 |
| 2016/0099851 A1* | 4/2016 | Archambault | H04J 14/0212 | 398/16 |
| 2016/0381441 A1* | 12/2016 | Nagamine | H04B 10/572 | 398/95 |
| 2018/0248643 A1* | 8/2018 | Ge | H04J 14/0227 | |
| 2018/0278359 A1* | 9/2018 | Robertson | H04J 14/0212 | |
| 2018/0367234 A1 | 12/2018 | Koopferstock | | |
| 2019/0058526 A1* | 2/2019 | Matsuyama | H04B 10/50 | |

* cited by examiner

OPTICAL SYSTEM INCLUDING A RECONFIGURABLE OPTICAL ADD/DROP MULTIPLEXER AND FILTERS

BACKGROUND

Field of the Disclosure

The present disclosure relates generally to optical communication networks and, more particularly, an optical system including a reconfigurable optical add/drop multiplexer and filters.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

Optical networks may also include various optical elements, such as amplifiers, dispersion compensators, multiplexer/demultiplexer filters, wavelength selective switches (WSS), optical switches, splitters, couplers, etc. to perform various operations within the network. In particular, optical networks may include reconfigurable optical add-drop multiplexers (ROADMs) that enable routing of optical signals and individual wavelengths to different destinations. Classic point-point or ROADM systems can use 50 or 100 GHz fixed grid multiplexer/demultiplexer devices. However, these types of systems may be difficult to implement with future transmission payloads that will get progressively larger with each new generation.

SUMMARY

Innovative aspects of the subject matter described in this specification may be embodied in a system that includes a first filter including i) a first port mapped to a first wavelength band and ii) a second port mapped to a second wavelength band, the first filter configured to: receive a first transmission signal at the first port and a second transmission signal at the second port, the first transmission signal within the first wavelength band and having a first signal width, the second transmission signal within the second wavelength band and having a second signal width; combine the first transmission signal and the second transmission signal; and output a first output transmission signal based on the combination of the first transmission signal and the second transmission signal; a second filter including i) a third port mapped to the first wavelength band and ii) a fourth port mapped to the second wavelength band, the second filter configured to: receive a third transmission signal at the third port and a fourth transmission signal at the fourth port, the third transmission signal within the first wavelength band and having a third signal width, the fourth transmission signal within the second wavelength band and having a fourth signal width, combine the third transmission signal and the fourth transmission signal; and output a second output transmission signal based on the combination of the third transmission signal and the fourth transmission signal; and a wavelength selector configured to: receive the first and the second output transmission signals; selectively combine the first and the second output transmission signals; and output a third output transmission signal based on the selective combination of the first and the second output transmission signals.

Other embodiments of these aspects include corresponding methods and apparatus.

These and other embodiments may each optionally include one or more of the following features. For instance, a third filter including i) a fifth port mapped to the first wavelength band and ii) a sixth port mapped to the second wavelength band, the second filter configured to: receive a fifth transmission signal at the fifth port and a sixth transmission signal at the sixth port, the fifth transmission signal within the first wavelength band and having a fifth signal width, the sixth transmission signal within the second wavelength band and having a sixth signal width; combine the fifth transmission signal and the sixth transmission signal; and output a fourth output transmission signal based on the combination of the fifth and the sixth transmission signals. The wavelength selector is further configured to: receive the fourth output transmission signal; selectively combine the first, second, and fourth output transmissions signals; and output the third output transmission signal based on the selective combination of the first, second, and the fourth output transmission signals. The first, the third, and the fifth transmission signal fill a frequency bandwidth of the first wavelength band. The first wavelength band and the second wavelength band are substantially the same frequency width. The frequency width of the first wavelength band and the second wavelength band are adjustable. The first signal width of the first transmission signal differs from the third signal width of the third transmission signal, and the second signal width of the second transmission signal differs from the fourth signal width of the fourth transmission signal. The selective combination of the first and the second output transmission signals is the first output transmission signal, the second output transmission signal, or both.

The features further include the third transmission signal is adjacent to the first transmission signal, and the fourth transmission signal is adjacent to the second transmission signal. The first filter further includes a fifth port mapped to a third wavelength band, the first filter further configured to: receive a fifth transmission signal at the fifth port, the fifth transmission signal within the third wavelength band and having a fifth signal width; combine the first, the second, and the fifth transmission signals; and output the first output transmission signal based on the combination of the first, the second, and the fifth transmission signal; wherein the second filter further includes a sixth port mapped to the third wavelength band, the second filter further configured to: receive a sixth transmission signal at the sixth port, the sixth transmission signal within the third wavelength band and having a sixth signal width; combine the third, the fourth, and the sixth transmission signal; and output the second output transmission signal based on the combination of the third, the fourth, and the sixth transmission signals. The first transmission signal and the second transmission signal are greater than 50 GHz. The first transmission signal and the second transmission signal are less than 50 GHz. The system further including an optical amplifier configured to receive the third output transmission signal, amplify the third output transmission signal, and output a fourth output transmission signal based on the amplified third output transmission signal. The system further includes a plurality of transponders, each transponder providing a respective transmission signal that is input to respective ports of the first and the second filters.

The features further include a first splitter configured to receive the first output transmission signal and split the first output transmission signal into a first split transmission signal and a second split transmission signal; a second splitter configured to receive the second output transmission signal and split the second output transmission signal into a third split transmission signal and a fourth split transmission signal; a first additional wavelength selector configured to: receive the first split transmission signal and third split transmission signals; selectively combine the first split and the third split transmission signals; and output a fourth output transmission signal based on the selective combination of the first and the third split transmission signals; and a second additional wavelength selector configured to: receive the second split transmission signal and fourth split transmission signals; selectively combine the second split and the fourth split transmission signals; and output a fifth output transmission signal based on the selective combination of the second and the fourth split transmission signals.

The system further including a first coupler configured to: receive a sixth output transmission signal from a third additional wavelength selector and a seventh output transmission signal from a fourth additional wavelength selector; couple the sixth output transmission signal and the seventh output transmission signal; and output a first coupled transmission signal based on the sixth output transmission signal and the seventh output transmission signal; a second coupler configured to: receive an eighth output transmission signal from the third additional wavelength selector and a ninth output transmission signal from the fourth additional wavelength selector; couple the eighth output transmission signal and the ninth output transmission signal; and output a second coupled transmission signal based on the eighth output transmission signal and the ninth output transmission signal. The system is included in a two-degree reconfigurable optical add-drop multiplexers (ROADM).

Innovative aspects of the subject matter described in this specification may be embodied in a method that include the actions of receiving, at a first filter, i) a first transmission signal at a first port of the first filter and ii) a second transmission signal at a second port of the first filter, the first transmission signal within a first wavelength band that is mapped to the first port and having a first signal width, and the second transmission signal within a second wavelength band that is mapped to the second port and having a second signal width; combining, by the first filter, the first and the second transmission signals; outputting, by the first filter, a first output transmission signal based on the combination of the first and the second transmission signals; receiving, at a second filter, i) a third transmission signal at a third port of a second filter and ii) a fourth transmission signal at a fourth port of the second filter, the third transmission signal within the first wavelength band that is mapped to the third port and having a third signal width, and the fourth transmission signal within the second wavelength band that is mapped to the fourth port and having a fourth signal width; combining, by the second filter, the third and the fourth transmission signals; outputting, by the second filter, a second output transmission signal based on the combination of the third and the fourth transmission signals; receiving, by a wavelength selector, the first and the second output transmission signals; selectively combining, by the wavelength selector, the first and the second output transmission signals; and outputting, by the wavelength selector, a third output transmission signal based on the selective combination of the first and the second output transmission signals.

Other embodiments of these aspects include corresponding systems and apparatus.

These and other embodiments may each optionally include one or more of the following features. For instance, receiving, at a third filter, i) a fifth transmission signal at a fifth port of the third filter and ii) a sixth transmission signal at a sixth port of the third filter, the fifth transmission signal within the first wavelength band that is mapped to the fifth port and having a fifth signal width, and the sixth transmission signal within the second wavelength band that is mapped to the sixth port and having a sixth signal width; combining, by the third filter, the fifth and the sixth transmission signals; and outputting, by the third filter, a fourth output transmission signal based on the combination of the fifth and the sixth transmission signals. Receiving, by the wavelength selector, the fourth output transmission signal; selectively combining, by the wavelength selector, the first, second, and fourth output transmissions signals; and outputting, by the wavelength selector, the third output transmission signal based on the selective combination of the first, second, and the fourth output transmission signals. The first, the third, and the fifth transmission signals fill a frequency bandwidth of the first wavelength band. The frequency width of the first wavelength band and the second wavelength band are adjustable. The first signal width of the first transmission signal differs from the third signal width of the third transmission signal, and the second signal width of the second transmission signal differs from the fourth signal width of the fourth transmission signal. The third transmission signal is adjacent to the first transmission signal, and the fourth transmission signal is adjacent to the second transmission signal.

Innovative aspects of the subject matter described in this specification may be embodied in a system that includes a first filter including i) a first port mapped to a first wavelength band and ii) a second port mapped to a second wavelength band, the first filter configured to: receive a first transmission signal at the first port and a second transmission signal at the second port, the first transmission signal within the first wavelength band and having a first signal width, the second transmission signal within the second wavelength band and having a second signal width; combine the first transmission signal and the second transmission signal; and output a first output transmission signal based on the combination of the first transmission signal and the second transmission signal; a second filter including i) a third port mapped to a third wavelength band and ii) a fourth port mapped to a fourth wavelength band, wherein the third wavelength band is off-set with respect to the first wavelength band and the fourth wavelength band is off-set with respect to the second wavelength band, the second filter configured to: receive a third transmission signal at the third port and a fourth transmission signal at the fourth port, the third transmission signal within the third wavelength band and having a third signal width, the fourth transmission signal within the fourth wavelength band and having a fourth signal width, combine the third transmission signal and the fourth transmission signal; and output a second output transmission signal based on the combination of the third transmission signal and the fourth transmission signal; and a wavelength selector configured to: receive the first and the second output transmission signals; selectively combine the first and the second output transmission signals; and output a third output transmission signal based on the selective combination of the first and the second output transmission signals.

Particular implementations of the subject matter described in this specification can be implemented so as to realize one or more of the following advantages. For example, the system provides use of inexpensive filters combined with low density ROADM on a Blade (RoB) type elements to create a system that can be used in future optical system generations that allows wavelengths of any type or width, to be packed with maximum density, and allows full use of a chosen wavelength band. The system can provide signal balancing providing enhanced signal performance.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
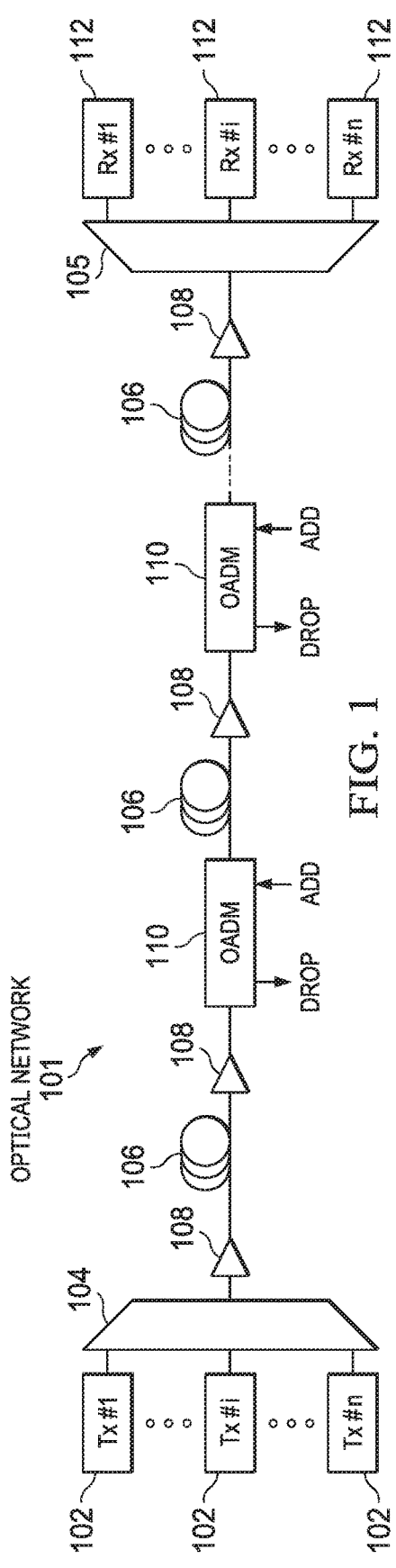
FIG. 1 is a block diagram of selected elements of an embodiment of an optical network.

This document describes methods and systems that combine a (low-cost) filter with a single add/drop port of a ROADM (on a blade, or RoB). This provides the ability to choose wavelengths and signal widths of the system using one layer of a wavelength selector, and provide a colorless, directionless, contentionless (CDC) function within each wavelength band. The filters can be added incrementally as needed, and can accommodate multiple bandwidths. The combination of the filters and the wavelength selector provides a configurable space such that an entire bandwidth can be utilized.

Specifically, this document describes an optical system that includes a first filter including i) a first port mapped to a first wavelength band and ii) a second port mapped to a second wavelength band. The first filter is configured to receive a first transmission signal at the first port and a second transmission signal at the second port, the first transmission signal within the first wavelength band and having a first signal width, the second transmission signal within the second wavelength band and having a second signal width; combine the first transmission signal and the second transmission signal; and output a first output transmission signal based on the combination of the first transmission signal and the second transmission signal. The optical system further includes a second filter including i) a third port mapped to the first wavelength band and ii) a fourth port mapped to the second wavelength band, the second filter configured to receive a third transmission signal at the third port and a fourth transmission signal at the fourth port, the third transmission signal within the first wavelength band and having a third signal width, the fourth transmission signal within the second wavelength band and having a fourth signal width, combine the third transmission signal and the fourth transmission signal; and output a second output transmission signal based on the combination of the third transmission signal and the fourth transmission signal. The optical system further includes a wavelength selector configured to receive the first and the second output transmission signals; selectively combine the first and the second output transmission signals; and output a third output transmission signal based on the selective combination of the first and the second output transmission signals.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

As noted above, ROADMs are deployed in many applications in optical networks. Typical ROADMs are designed to accommodate 8 or more degrees, each of which may support up to 96 optical channels or wavelengths in particular implementations. In describing a ROADM generally, a 'degree' is a term used to describe a switched optical path to or from the ROADM, which may be a bidirectional optical path or a pair of optical fibers in some instances. However, it has been observed that a typical ROADM in use utilizes two degrees and a small number of add and drop wavelengths.

Typical designs for ROADMs include a so-called "route and select" architecture in which two wavelength selective switches (WSS) are used to select and route optical signals. However, a WSS is a relatively complex optical device and typical designs for route and select ROADMs accommodate 8 or more degrees. Concurrently, the use of coherent receiver optics has become widespread and provides the ability to exclusively tune a desired wavelength.

As will be described in further detail, a route and collect ROADM is disclosed herein that is enabled to support the bandwidth of an optical signal. The route and collect ROADM disclosed herein may be implemented with a single 1×2 wavelength selective element, such as a WSS among other implementations, along with other passive optical elements. The route and collect ROADM disclosed herein may be implemented as a bidirectional device that can support optical signals traveling in both directions along an optical network. The route and collect ROADM disclosed herein may support add and drop of a plurality of wavelengths while transmitting a pass through optical signal with full bandwidth.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals (or optical signals) and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) that may be included in a ROADM. ROADMs are considered 'colorless' when the ROADM is able to add/drop any arbitrary wavelength. ROADMs are considered 'directionless' when the ROADM is able to add/drop any wavelength regardless of the direction of propagation. ROADMs are considered 'contentionless' when the ROADM is able to switch any contended wavelength (already occupied wavelength) to any other wavelength that is available. As shown OADM 110 may represent an implementation of a route and collect ROADM, as disclosed herein.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

Figure 2:
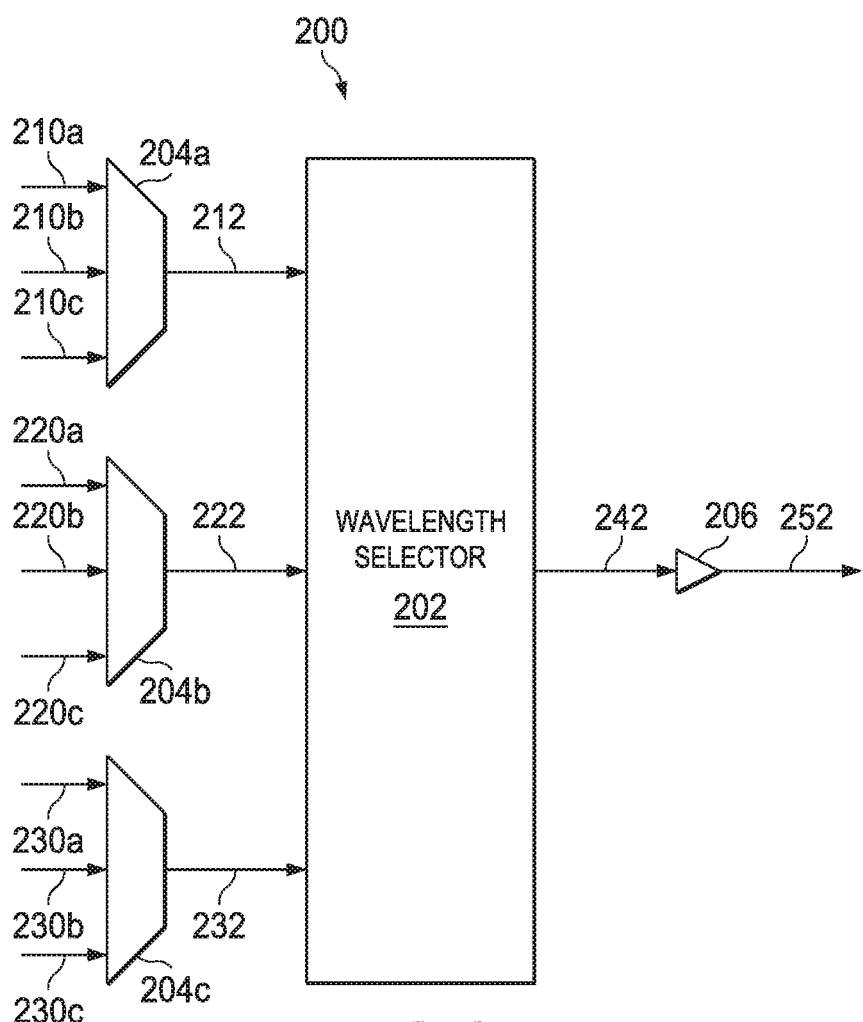
FIG. 2 is an optical assembly used in the optical network.

FIG. 2 illustrates an optical assembly 200. The assembly 200 includes a wavelength selector (or wavelength selective switch (WSS)) 202, a first filter 204a, a second filter 204b, a third filter 204c (collectively referred to as filters 204), and an optical amplifier 206. The assembly 200 can include any number of filters 204 depending on the application desired (e.g., between 8-16 filters). In some example, the number of filters 204 is based on a number of input ports of the wavelength selector 202. In some examples, each of the filters 204 is substantially the same, described further below.

The first filter 204a can include a first port 210a, a second port 210b, and a third port 210c (collectively referred to as ports 210). However, the first filter 204a can include any number of ports 210 depending on the application desired (e.g., 8 ports). Each of the ports 210 can be connected to a transponder (not shown) that provides a respective transmission signal that is input to the respective ports 210. Each of the ports 210 can be mapped to respective wavelength bands. For simplicity of illustration, only three filters 204 are shown, with each filter 204 illustrated as including three ports. However, in some examples, the optical assembly 200 can include eight filters 204 each having eight ports.

Figure 3:
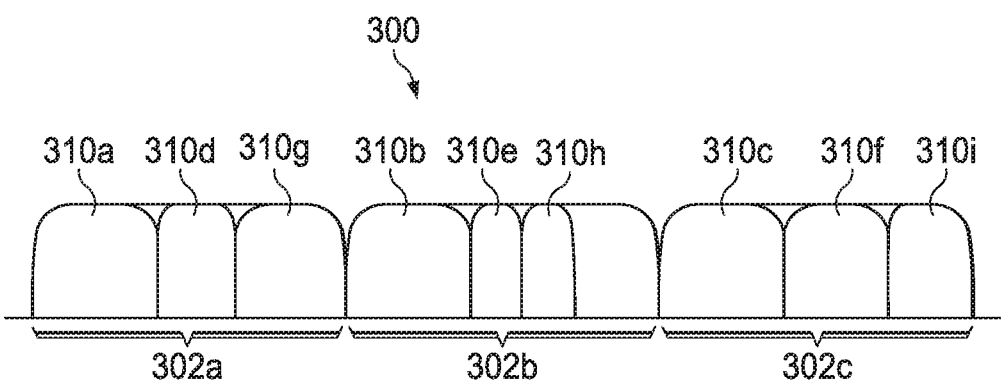
FIG. 3 illustrates a wavelength transmission band that includes wavelength bands.

FIG. 3 illustrates a wavelength transmission band 300 that includes wavelength bands 302a, 302b, 302c (collectively referred to as wavelength bands 302); however, the transmission band 300 can include any number of wavelength bands 302 depending on the application desired. The wavelength bands 302 are distinct portions of the transmission band 300. In some examples, the wavelength bands 302 are all substantially the same frequency width. In some examples, the frequency width of the frequency bands 302 are adjustable (or configurable). That is, the frequency width of the frequency bands 302 can be adjusted based on the desired implementations, the number of filters 204, and/or the transmission band 300. In some examples, the transmission band 300 can be a C-band, and be 4.8 terahertz (THz) wide. In some examples, when the transmission band 300 is 4.8 THz wide, each of the wavelength bands is 1.6 GHz wide. However, in some examples, the transmission band 300 can include eight wavelength bands 302, and each wavelength band is 600 GHz wide.

In the illustrated example of the transmission band 300, the first port 210a can be mapped to the wavelength band 302a, the second port 210b can be mapped to the wavelength band 302b, and the third port 210c can be mapped to the wavelength band 302c. In some examples, mapping of the ports 210 to the wavelength bands 302 can include that the corresponding transponders only provide transmission signals to the respective ports 210 within the appropriate wavelength bands. To that end, the first filter 204a can receive a first transmission signal at the first port 210a, a second transmission signal at the second port 210b, and a third transmission signal at the third port 210c. The first transmission signal can be within the wavelength band 302a, shown as first transmission signal 310a, and can have a first signal width. The second transmission signal can be within the second wavelength band 302b, shown as second transmission signal 310b, and can have a second signal width. The third transmission signal can be within the third wavelength band 302c, shown as third transmission signal 310c, and can have a third signal width. In some examples, the first 310a, the second 310b, and/or the third transmission signals 310c can be greater than 50 GHz. In some examples, the first 310a, the second 310b, and/or the third transmission signals 310c can be less than 50 GHz.

In some implementations, the first filter 204a can combine the first transmission signal 310a, the second transmission signal 310b, and the third transmission signal 310c. The first filter 204a can then output a first output transmission signal 212 based on the combination of the first transmission signal 310a, the second transmission signal 310b, and the third transmission signal 310c.

The second filter 204b can include a first port 220a, a second port 220b, and a third port 220c (collectively referred to as ports 220). However, the second filter 204b can include any number of ports 220 depending on the application desired (e.g., 8 ports). Each of the ports 220 can be connected to a transponder (not shown) that provides a respective transmission signal that is input to the respective ports 220. Each of the ports 220 can be mapped to respective wavelength bands.

In the illustrated example of the transmission band 300, the first port 220a can be mapped to the wavelength band 302a, the second port 220b can be mapped to the wavelength band 302b, and the third port 220c can be mapped to the wavelength band 302c. In some examples, mapping of the ports 220 to the wavelength bands 302 can include that the corresponding transponders only provide transmission signals to the respective ports 220 within the appropriate wavelength bands. To that end, the second filter 204b can receive a fourth transmission signal at the first port 220a, a fifth transmission signal at the second port 220b, and a sixth transmission signal at the third port 220c. The fourth transmission signal can be within the wavelength band 302a, shown as fourth transmission signal 310d, and can have a fourth signal width. The fifth transmission signal can be within the second wavelength band 302b, shown as fifth transmission signal 310e, and can have a fifth signal width. The sixth transmission signal can be within the third wavelength band 302c, shown as sixth transmission signal 310f, and can have a sixth signal width. In some examples, the fourth 310d, the fifth 310e, and/or the sixth transmission signal 310f can be greater than 50 GHz. In some examples, the fourth 310d, the fifth 310e, and/or the sixth transmission signals 310f can be less than 50 GHz.

In some implementations, the second filter 204b can combine the fourth transmission signal 310d, the fifth transmission signal 310e, and the sixth transmission signal 310f The second filter 204b can then output a second output transmission signal 222 based on the combination of the fourth transmission signal 310d, the fifth transmission signal 310e, and the sixth transmission signal 310f.

The third filter 204c can include a first port 230a, a second port 230b, and a third port 230c (collectively referred to as ports 230). However, the third filter 204c can include any number of ports 230 depending on the application desired (e.g., 8 ports). Each of the ports 230 can be connected to a transponder (not shown) that provides a respective transmission signal that is input to the respective ports 230. Each of the ports 230 can be mapped to respective wavelength bands.

In the illustrated example of the transmission band 300, the first port 230a can be mapped to the wavelength band 302a, the second port 230b can be mapped to the wavelength band 302b, and the third port 230c can be mapped to the wavelength band 302c. In some examples, mapping of the ports 230 to the wavelength bands 302 can include that the corresponding transponders only provide transmission signals to the respective ports 230 within the appropriate wavelength bands. To that end, the third filter 204c can receive a seventh transmission signal at the first port 230a, an eighth transmission signal at the second port 230b, and a ninth transmission signal at the third port 230c. The seventh transmission signal can be within the wavelength band 302a, shown as seventh transmission signal 310g, and can have a seventh signal width. The eighth transmission signal can be within the second wavelength band 302b, shown as eighth transmission signal 310h, and can have an eighth signal width. The ninth transmission signal can be within the third wavelength band 302c, shown as ninth transmission signal 310i, and can have a ninth signal width. In some examples, the seventh 310g, the eighth 310h, and/or the ninth transmission signal 310i can be greater than 50 GHz. In some examples, the seventh 310g, the eight 310h, and/or the ninth transmission signals 310i can be less than 50 GHz.

In some implementations, the third filter 204c can combine the seventh transmission signal 310g, the eighth transmission signal 310h, and the ninth transmission signal 310i. The third filter 204c can then output a third output transmission signal 232 based on the combination of the seventh transmission signal 310g, the eighth transmission signal 310h, and the ninth transmission signal 310i.

In some examples, the first transmission signal 310a, the second transmission signal 310b, the third transmission signal 310c, the fourth transmission signal 310d, the fifth transmission signal 310e, the sixth transmission signal 310f, the seventh transmission signal 310g, the eighth transmission signal 310h, and the ninth transmission signal 310i can be collectively referred to as transmission signals 310.

In some examples, each of the filters 204 are substantially the same. Specifically, each of the filters 204 can include the same number of ports, and each of the respective ports can be mapped to the same frequency bands. For example, the first ports 210a, 220a, 230a are each mapped to the wavelength band 302a; the second ports 210b, 220b, 230b are each mapped to the wavelength band 302b; and the third ports 210c, 220c, 230c are each mapped to the wavelength band 302c.

In some examples, the first transmission signal 310a, the fourth transmission signal 310d, and the seventh transmission signal 310g substantially fill a frequency bandwidth of the wavelength band 302a. That is, each of the first transmission signal 310a, the fourth transmission signal 310d, and the seventh transmission signal 310g spans the width of the frequency band 302a. In some examples, each of the first transmission signal 310a, the fourth transmission signal 310d, and the seventh transmission signal 310g do not overlap with one another. For example, each of the first transmission signal 310a, the fourth transmission signal 310d, and the seventh transmission signal 310g are adjacent to one another (or as close as possible) such that an entirety of the frequency band 302a is utilized. Specifically, the first transmission signal 310a is adjacent to the fourth transmission signal 310d, and the fourth transmission signal 310d is adjacent to the seventh transmission signal 310g. In some examples, the first signal width of the first transmission signal 310a differs from the fourth signal width of the fourth transmission signal 310d and the seventh signal width of the seventh transmission signal 310g; and the fourth signal width of the fourth transmission signal 310d differs from the seventh signal width of the seventh transmission signal 310g.

In some examples, the second transmission signal 310b, the fifth transmission signal 310e, and the eighth transmission signal 310h do not substantially fill a frequency bandwidth of the wavelength band 302b. In some examples, each of the second transmission signal 310b, the fifth transmission signal 310e, and the eighth transmission signal 310h do not overlap with one another. For example, each of the second transmission signal 310b, the fifth transmission signal 310e, and the eighth transmission signal 310h are adjacent to one another (or as close as possible). Specifically, the second transmission signal 310b is adjacent to the fifth transmission signal 310e, and the fifth transmission signal 310e is adjacent to the eighth transmission signal 310h. In some examples, the second signal width of the second transmission signal 310b differs from the fifth signal width of the fifth transmission signal 310e and the eighth signal width of the eighth transmission signal 310h; and the fifth signal width of the fifth transmission signal 310e differs from the eighth signal width of the eighth transmission signal 310h.

In some examples, the third transmission signal 310c, the sixth transmission signal 310f, and the ninth transmission signal 310i substantially fill a frequency bandwidth of the wavelength band 302c. That is, each of the third transmission signal 310c, the sixth transmission signal 310f, and the ninth transmission signal 310i spans the width of the frequency band 302c. In some examples, each of the third transmission signal 310c, the sixth transmission signal 310f, and the ninth transmission signal 310i do not overlap with one another. For example, each of the third transmission signal 310c, the sixth transmission signal 310f, and the ninth transmission signal 310i are adjacent to one another (or as close as possible) such that an entirety of the frequency band 302c is utilized. Specifically, the third transmission signal 310c is adjacent to the sixth transmission signal 310f, and the sixth transmission signal 310f is adjacent to the ninth transmission signal 310i. In some examples, the third signal width of the third transmission signal 310c differs from the sixth signal width of the sixth transmission signal 310f and the ninth signal width of the ninth transmission signal 310i; and the sixth signal width of the sixth transmission signal 310f differs from the ninth signal width of the ninth transmission signal 310i.

The wavelength selector 202 can receive the first output transmission signal 212, the second output transmission signal 222, and the third output transmission signal 232. The wavelength selector 202 can selectively combine the first output transmission signal 212, the second output transmission signal 222, and the third output transmission signal 232, and output a fourth output transmission signal 242 based on the selective combination of the first output transmission signal 212, the second output transmission signal 222, and the third output transmission signal 232. In some examples, the selective combination of the first output transmission signal 212, the second output transmission signal 222, and the third output transmission signal 232 can be any combination of the first output transmission signal 212, the second output transmission signal 222, and the third output transmission signal 232.

The optical amplifier 206 can receive the fourth output transmission signal 242, amplify the fourth output transmission signal 242, and output a fifth output transmission sign 252 based on the amplified fourth output transmissions signal 242.

Figure 4:
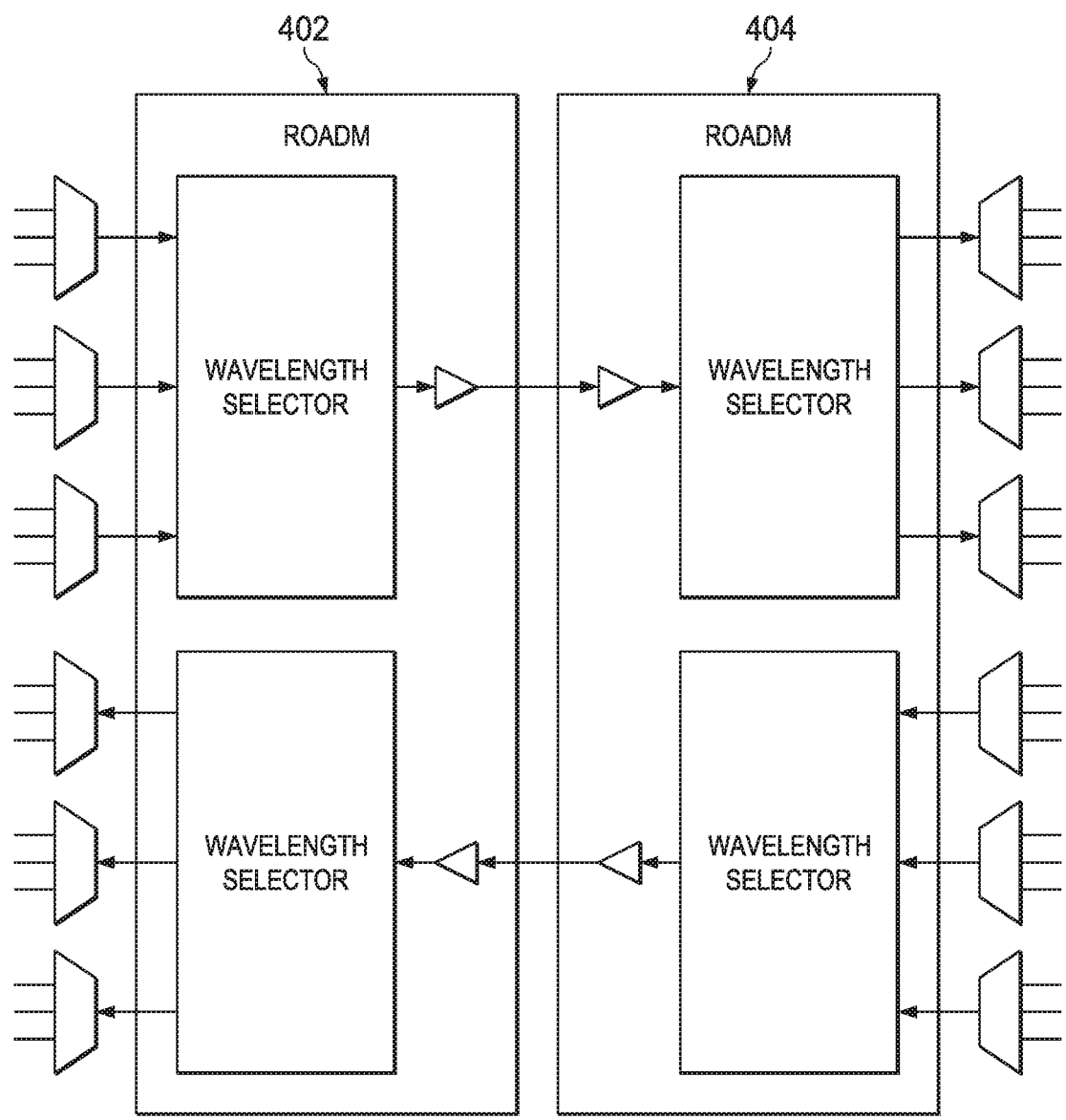
FIG. 4 illustrates an example optical environment that includes a first ROADM and a second ROADM.

In some examples, the optical assembly 200 can be implemented with a ROADM configuration, such as the ROADM 110 of FIG. 1. For example, the optical assembly 200 can be implemented in a one-degree ROADM. FIG. 4 illustrates an example optical environment that includes a first ROADM 402 and a second ROADM 404. Each of the ROADMs 402, 404 can include the wavelength selector 202 and the optical amplifier 206, as described with respect to FIG. 2, in each direction of communication (e.g., east and west).

Figure 5:
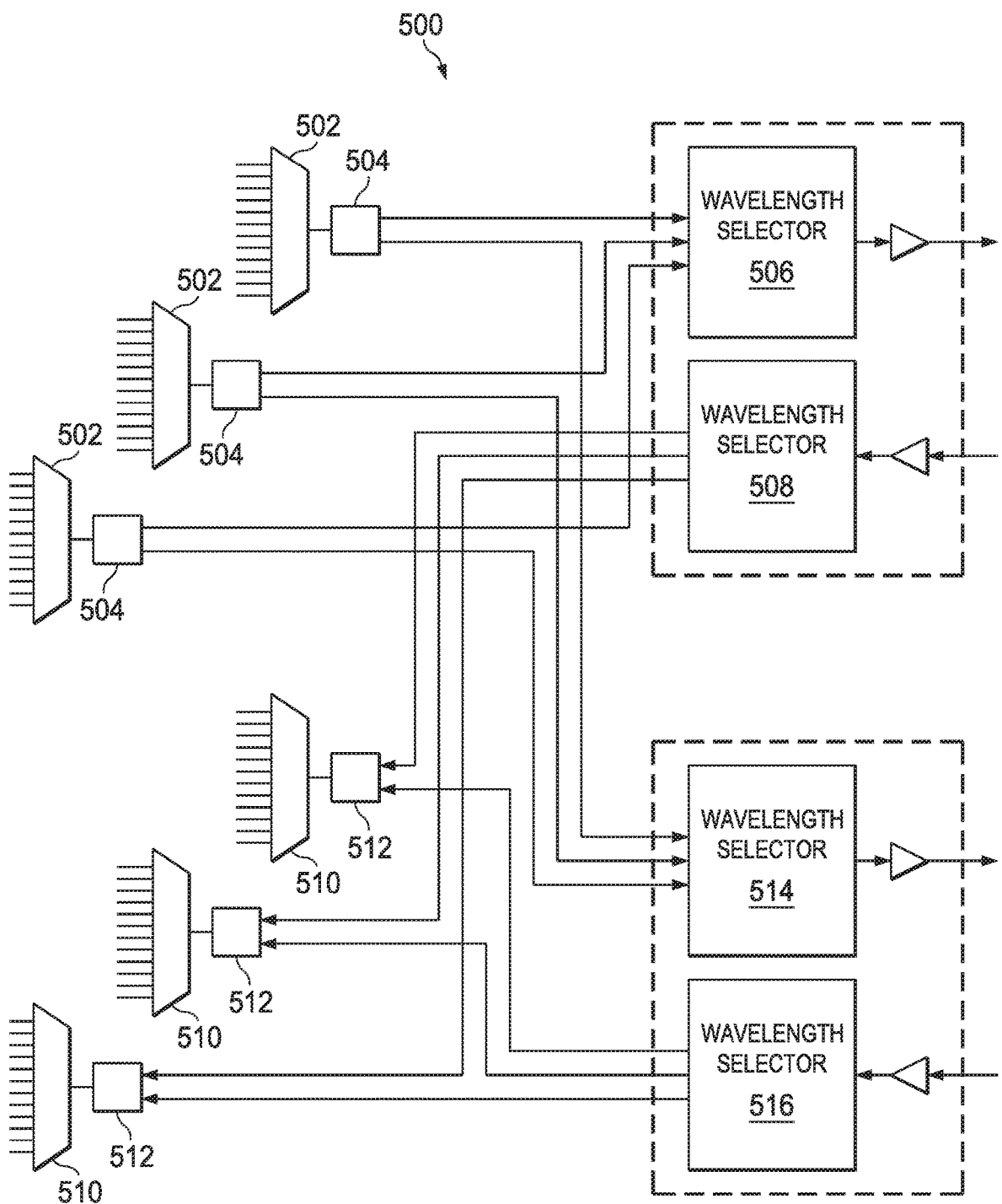
FIG. 5 illustrates an optical environment including a two-degree ROADM.

Additionally, the optical assembly 200 can be used in a two-degree ROADM, as shown in optical environment 500 of FIG. 5 (a colorless, directionless, contentionless environment). Specifically, the output of each filters 502, similar to the filters 204 of FIG. 2, can be connected to a respective splitter 504 that splits the output signal of the filters 502 (e.g., at half-power) that is input to the wavelength selectors 506, 514, similar to the wavelength selector 202 of FIG. 2. Additionally, the input to the filters 510, similar to the filters 204 of FIG. 2, can be connected to a respective coupler 512 that couples the output signals of the wavelength selectors 508, 516, similar to the wavelength selector 202 of FIG. 2.

Referring back to FIG. 2, in some embodiments, one of the filters 204 maybe off-set with respect to the other filters 204. Specifically, referring to FIG. 3, a utilization of an entire bandwidth of each of the wavelength bands 302 of the transmission band 300 by the transmission signals may not be possible or feasible. For example, there may be a practical limit on the sharpness of the corners between the wavelength bands 302 for each of the filters 204. In the illustrated example, where each frequency band is 1.6 GHz wide, there may be only 1.5 GHz that is useful.

To that end, one of the wavelength bands associated with one of the filters 204 can be off-set from the wavelength bands that are associated with the remaining filters 204. For example, each wavelength band that is mapped to the ports 220 of the second filter 204b can be off-set by 0.5 GHz as compared to the wavelength bands that are mapped to the ports 210 of the first filter 204a. As a result, each portion of the transmission band 300 can be utilized such that there is no (or minimal) gap between the wavelength bands of the transmission band 300.

Figure 6:
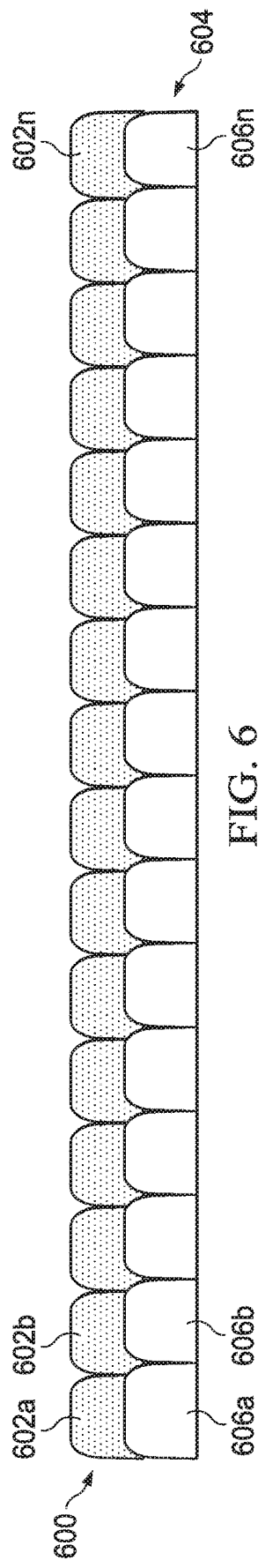
FIG. 6 illustrates off-set wavelength transmission bands.

FIG. 6 illustrates a first transmission band 600 including wavelength bands 602a, 602b, . . . , 602n (collectively referred to as wavelength bands 602), and a second transmission band 604 including wavelength bands 606a, 606b, . . . , 606n (collectively referred to as wavelength bands 606). The wavelength bands 600 can be off-set with respect to the wavelength bands 604.

Figure 7:
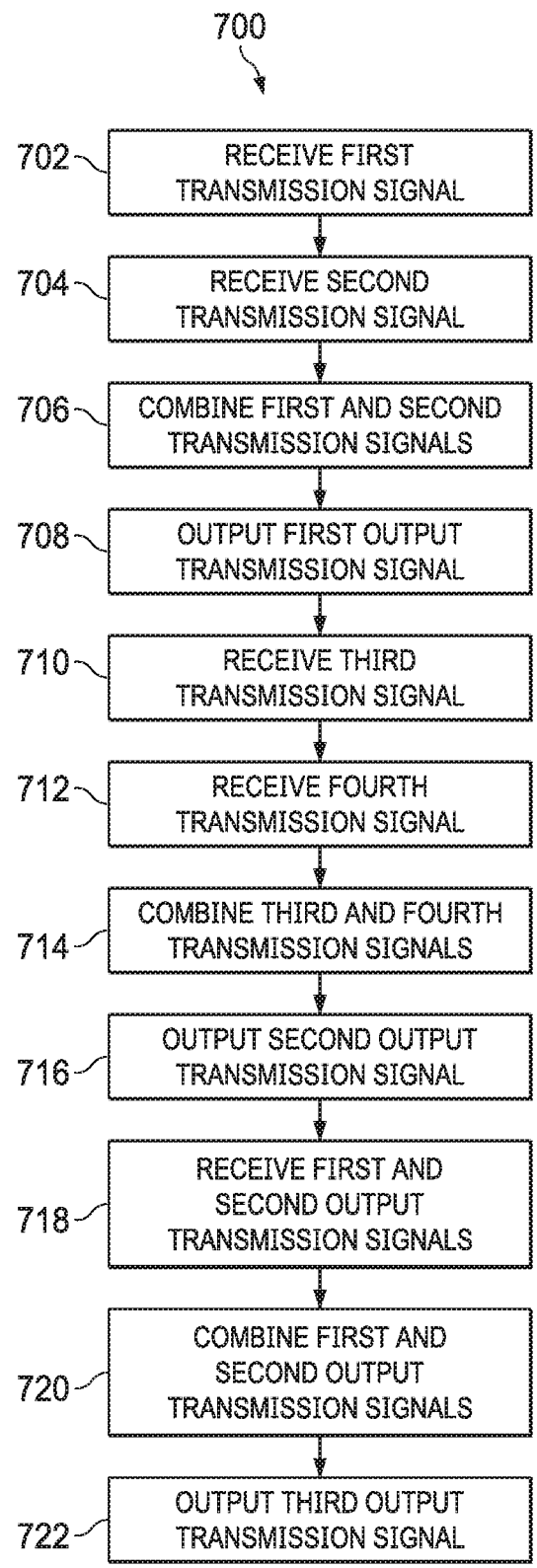
FIG. 7 illustrates a flowchart for implementing a ROADM with filters.

FIG. 7 illustrates a flowchart depicting selected elements of an embodiment of a method 700 for implementing a ROADM with filters. The method 700 may be performed by the optical assembly 200 described herein with reference to FIGS. 1-6. It is noted that certain operations described in method 700 may be optional or may be rearranged in different embodiments.

A first transmission signal is received at a first port of a first filter (702). For example, the first port 210a of the first filter 204a receives the first transmission signal 310a. In some examples, the first transmission signal can be within a first wavelength band that is mapped to the first port and has a first signal width. A second transmission signal is received at a second port of the first filter (704). For example, the second port 210b of the first filter 204a receives the second transmission signal 310b. In some examples, the second transmission signal can be within a second wavelength band that is mapped to the second port and has a second signal width. The first and the second transmission signals are combined by the first filter (706). For example, the first filter 204a combines the first transmission signal 310a and the second transmissions signal 310b. A first output transmission signal is output by the first filter based on the combination of the first and the second transmission signals (708). For example, the first filter 204a outputs the first output transmission signal 212 that includes the combination of the first transmission signal 310a and the second transmission signal 310b.

A third transmission signal is received at a third port of a second filter (710). For example, the first port 220a of the second filter 204b receives the transmission signal 310d. In some examples, the third transmission signal can be within the first wavelength band that is mapped to the third port and has a third signal width. A fourth transmission signal is received at a fourth port of the second filter (712). For example, the second port 220b of the second filter 204b receives the transmission signal 310e. In some examples, the fourth transmission signal can be within the second wavelength band that is mapped to the fourth port and has a fourth signal width. The third and the fourth transmission signals are combined by the second filter (714). For example, the second filter 204b combines the transmission signal 310d and the transmissions signal 310e. A second output transmission signal is output by the second filter based on the combination of the third and the fourth transmission signals (716). For example, the second filter 204b outputs the second output transmission signal 222 that includes the combination of the transmission signal 310d and the second transmission signal 310e.

A wavelength selector receives the first and the second output transmission signals (718). For example, the wavelength selector 202 receives the first output transmission signal 212 and the second output transmission signal 222 comprising transmission signals 310a, 310b, 310d, 310e. The first and the second output transmission signals are selectively combined by the wavelength selector (720). For example, the wavelength selector 202 selectively combines the first output transmission signal 212 and the second output transmission signal 222. A third output transmission signal is output by the wavelength selector based on the selective combination of the first and the second output transmission signals (722). For example, the wavelength selector 202 outputs the fourth output transmission signal 242 based on the selective combination of the first output transmission signal 212 and the second output transmission signal 222.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An optical system comprising:
a first filter including i) a first port mapped to a first wavelength band and ii) a second port mapped to a second wavelength band, the first filter configured to:
  receive a first transmission signal at the first port and a second transmission signal at the second port, the first transmission signal within the first wavelength band and having a first signal width, the second transmission signal within the second wavelength band and having a second signal width;
  combine the first transmission signal and the second transmission signal; and
  output a first output transmission signal based on the combination of the first transmission signal and the second transmission signal;
a first splitter configured to:
  receive the first output transmission signal and split the first output transmission signal into a first split transmission signal and a second split transmission signal;
a second filter including i) a third port mapped to the first wavelength band and ii) a fourth port mapped to the second wavelength band, the second filter configured to:
  receive a third transmission signal at the third port and a fourth transmission signal at the fourth port, the third transmission signal within the first wavelength band and having a third signal width, the fourth transmission signal within the second wavelength band and having a fourth signal width,
  combine the third transmission signal and the fourth transmission signal; and
  output a second output transmission signal based on the combination of the third transmission signal and the fourth transmission signal;
a second splitter configured to:
  receive the second output transmission signal and split the second output transmission signal into a third split transmission signal and a fourth split transmission signal;
a first wavelength selector configured to:
  receive the first split transmission signal and third split transmission signals;
  selectively combine the first split and the third split transmission signals; and
  output a third output transmission signal based on the selective combination of the first and the third split transmission signals; and
a second wavelength selector configured to:
  receive the second split transmission signal and fourth split transmission signals;
  selectively combine the second split and the fourth split transmission signals;
  output a fourth output transmission signal based on the selective combination of the second and the fourth split transmission signals; and a first coupler configured to:
  receive a fifth output transmission signal from a third wavelength selector and a sixth output transmission signal from a fourth wavelength selector;
  couple the fifth output transmission signal and the sixth output transmission signal; and
  output a first coupled transmission signal based on the fifth output transmission signal and the sixth output transmission signal;
a second coupler configured to:
  receive a seventh output transmission signal from the third wavelength selector and an eighth output transmission signal from the fourth wavelength selector;
  couple the seventh output transmission signal and the eighth output transmission signal; and
  output a second coupled transmission signal based on the seventh output transmission signal and the eighth output transmission signal.

2. The system of claim 1, wherein the first wavelength band and the second wavelength band are substantially a same frequency width.

3. The system of claim 1, wherein a frequency width of the first wavelength band and the second wavelength band are adjustable.

4. The system of claim 1, wherein the first signal width of the first transmission signal differs from the third signal width of the third transmission signal, and the second signal width of the second transmission signal differs from the fourth signal width of the fourth transmission signal.

5. The system of claim 1, wherein the first filter further includes a fifth port mapped to a third wavelength band, the first filter further configured to:
  receive a fifth transmission signal at the fifth port, the fifth transmission signal within the third wavelength band and having a fifth signal width;
  combine the first, the second, and the fifth transmission signals; and
  output the first output transmission signal based on the combination of the first, the second, and the fifth transmission signal;
  wherein the second filter further includes a sixth port mapped to the third wavelength band, the second filter further configured to:
  receive a sixth transmission signal at the sixth port, the sixth transmission signal within the third wavelength band and having a sixth signal width;
  combine the third, the fourth, and the sixth transmission signal; and
  output the second output transmission signal based on the combination of the third, the fourth, and the sixth transmission signals.

6. The system of claim 1, wherein the first transmission signal and the second transmission signal are greater than 50 GHz.

7. The system of claim 1, wherein the first transmission signal and the second transmission signal are less than 50 GHz.

8. The system of claim 1, further comprising an optical amplifier configured to receive the third output transmission signal, amplify the third output transmission signal, and output a fourth output transmission signal based on the amplified third output transmission signal.

9. The system of claim 1, wherein the system is included in a two-degree or more reconfigurable optical add-drop multiplexers (ROADM).

10. The system of claim 1, wherein the first wavelength band is off-set with respect to the second wavelength band.

11. A method, comprising:
receiving, at a first filter, i) a first transmission signal at a first port of the first filter and ii) a second transmission signal at a second port of the first filter, the first transmission signal within a first wavelength band that is mapped to the first port and having a first signal width, and the second transmission signal within a second wavelength band that is mapped to the second port and having a second signal width;

combining, by the first filter, the first and the second transmission signals;

outputting, by the first filter, a first output transmission signal based on the combination of the first and the second transmission signals;

receiving, at a second filter, i) a third transmission signal at a third port of a second filter and ii) a fourth transmission signal at a fourth port of the second filter, the third transmission signal within the first wavelength band that is mapped to the third port and having a third signal width, and the fourth transmission signal within the second wavelength band that is mapped to the fourth port and having a fourth signal width;

combining, by the second filter, the third and the fourth transmission signals;

outputting, by the second filter, a second output transmission signal based on the combination of the third and the fourth transmission signals;

receiving, by a first wavelength selector, the first and the second output transmission signals;

selectively combining, by the first wavelength selector, the first and the second output transmission signals;

outputting, by the first wavelength selector, a third output transmission signal based on the selective combination of the first and the second output transmission signals;

receiving, by a second wavelength selector, the second split transmission signal and fourth split transmission signals;

selectively combining, by the second wavelength selector, the second split and the fourth split transmission signals;

outputting, by the second wavelength selector, a fourth output transmission signal based on the selective combination of the second and the fourth split transmission signals; and a first coupler configured to:

receiving, by a first coupler, a fifth output transmission signal from a third wavelength selector and a sixth output transmission signal from a fourth wavelength selector;

coupling, by the first coupler, the fifth output transmission signal and the sixth output transmission signal;

outputting, by the first coupler, a first coupled transmission signal based on the fifth output transmission signal and the sixth output transmission signal;

receiving, by a second coupler, a seventh output transmission signal from the third wavelength selector and an eighth output transmission signal from the fourth wavelength selector;

coupling, by the second coupler, the seventh output transmission signal and the eighth output transmission signal; and outputting, by the second coupler, a second coupled transmission signal based on the seventh output transmission signal and the eighth output transmission signal.

12. The method of claim 11, wherein the first wavelength band is off-set with respect to the second wavelength band.

* * * * *